Feb. 14, 1928.
F. B. MASON
1,659,534
OIL VISCOSITY TESTER
Filed Jan. 16, 1926
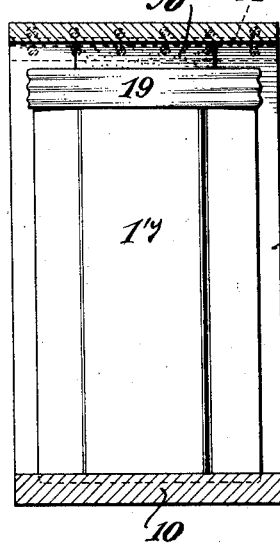
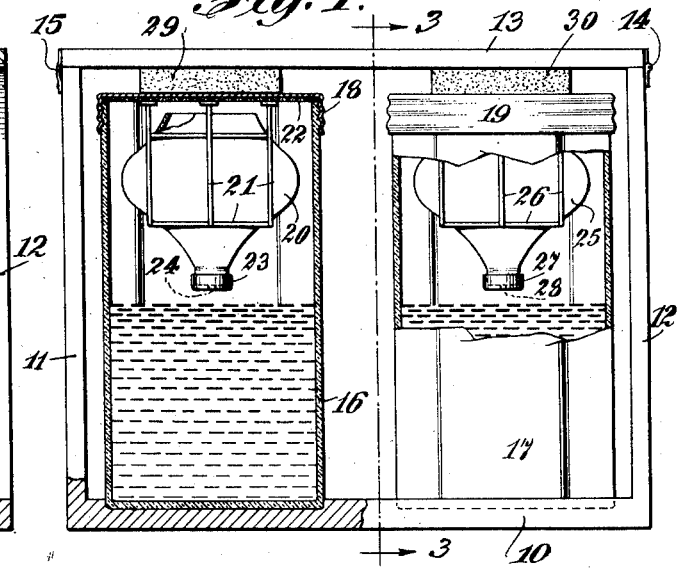
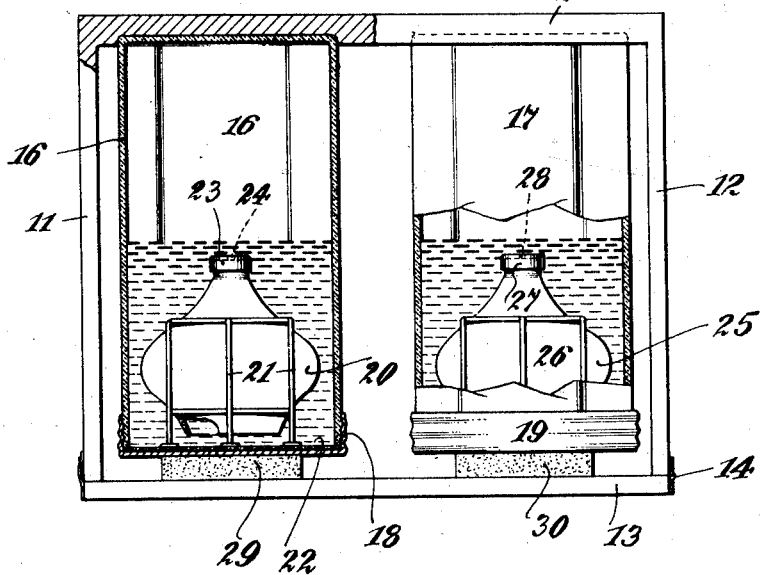
INVENTOR
Frank B. Mason
BY
his ATTORNEYS Patented Feb. 14, 1928.

1,659,534

UNITED STATES PATENT OFFICE.

FRANK B. MASON, OF NEW PROVIDENCE, NEW JERSEY.

OIL-VISCOSITY TESTER.

Application filed January 16, 1926. Serial No. 81,651.

As is generally understood the efficient working life of lubricating oils is a decidedly variable quantity. Furthermore as is also appreciated, it is oftentimes difficult to determine in the use of any particular lubricating oil when the oil should be changed. It consequently results in some cases in using the oil after it has entirely lost its useful life in which its lubricating value is substantially nil and in which the parts to be lubricated are likely to burn out, and in other instances to dispense with the old oil and replace it with new before it has lost its useful life, and, in which cases of course, there is a waste of the oil.

The object of my present invention is the provision of a relatively simple apparatus adapted for use in testing lubricating oil to determine whether or not the same should be changed. This device is particularly adapted for drivers of motor vehicles, although of course, its use is not so limited. It will also be understood that the device is not meant to function with scientific accuracy but to determine the question of the quality of the oil with sufficient accuracy to enable the operator to determine when the oil should be changed. In the use of the device the operator merely withdraws a relatively small quantity of the oil being used in a crank case of a motor vehicle for example, and by placing the same in the apparatus is enabled to make a comparison between the same and a standard oil to determine whether or not the oil being used should be withdrawn and replaced by a new supply, or whether the old oil may be safely used for another period of time. This comparison is made by comparing the flow of the old oil relatively to a standard oil, and as hereinafter more particularly described, if the flow of the predetermined quantity of the old oil is sufficiently more rapid than that of the same quantity of standard oil the old oil should be changed, and otherwise, the old oil is still shown to be useful and may be employed for a further period.

In the drawing Figure 1 is an elevation and partial section of an oil viscosity tester made in accordance with my invention.

Fig. 2 is a similar view showing the apparatus inverted, and

Fig. 3 is a section on line 3—3, Fig. 1.

In carrying out the invention the apparatus made in accordance therewith comprises a suitable frame made of wood or metal or other suitable material so as to include a base 10, end walls or members 11 and 12 and a top 13. The top 13 may be connected to the end wall 12 by a hinge 14 or otherwise, and the cover suitably maintained in its normal position by a latch or lock 15 or otherwise carried at the opposite end of the top and adapted to engage with the end wall 11.

Within the frame I employ a plurality of containers. As illustrated, the apparatus includes two of these containers as indicated at 16 and 17 respectively. Each of these preferably comprises a glass jar or other similar structure. In any event, the material of which these containers is made must be sufficiently transparent or translucent to enable the operator to see into the same. As illustrated, the container 16 is provided with a screw cover 18 and the container 17 with a screw cover 19. The container 16 is provided with a receptacle 20 which is secured in position therein adjacent the upper end thereof when closed, by means of a cage 21 made of suitable wire or other material. As illustrated, the cage is connected to the screw cover, although as will be understood, the receptacle may be otherwise mounted in position within the cover. Also as illustrated, the screw cover may be fitted with a liner or gasket 22 in order to make a tight joint between the same and the upper edge of the container. The receptacle 20 is open ended and at its smaller end which is the lower end, when in its normal position is provided with a gage cap 23 in which there is an opening or orifice 24.

Similarly in the container 17 there is a receptacle 25. This is in all respects similar to the receptacle 20 and is suitably mounted within the container 17 by means of a wire cage 26 or otherwise. The normal lower end of this receptacle 25 is provided with a gage cap 27 having an opening or orifice 28 therein. The receptacles 20 and 25 are so mounted as to assume substantially the same positions as the containers in which they are mounted, and these containers are normally maintained in position in the frame by means of yielding blocks 29 and 30 made of rubber or other similar material and so connected to the top of the frame as to bear against the screw covers of the containers to maintain the same in position within the frame. Also as indicated, these containers may be fitted in recesses provided therefor in the base of the frame in order to assist in maintaining the containers in their intended positions within the frame.

In the use of the apparatus hereinbefore described, one of the containers for example, the container 17 is provided with a quantity of oil for instance, of a predetermined viscosity which for practical purposes may be considered standard. The quantity of oil thus placed in the container 17 is sufficient to approximately half fill the container as indicated in Fig. 1 and in any event, is sufficient to cause the receptacle 25 to be completely filled with the oil when the container is inverted as shown in Fig. 2. The oil thus placed in the container 17 is maintained therein constantly. In wishing to test the viscosity of oil being used, the operator withdraws a predetermined quantity from the crank case for example, and places the same in the container 16. The quantity of oil thus placed in the container 16 should be substantially the same as that in the container 17. The frame with the containers therein is then inverted so as to assume a position as illustrated in Fig. 2. In this position as will be understood, the oil which is considered standard in the container 17 completely fills the receptacle 25 and in like manner the oil to be tested in the container 16 completely fills the receptacle 20. The apparatus of course, is maintained in the inverted position until this condition exists, hence the necessity of employing sufficient oil to extend above the discharge ends of the receptacles when the apparatus is inverted. The apparatus is then returned to its normal or upright position as shown in Fig. 1, and as will be apparent, the oil flows from the receptacles 25 and 20. The preferable manner in which to exercise the invention is to dilute the so-called standard oil in any suitable manner so that it will have substantially the consistency of an oil when the useful life thereof is exhausted, whereby assuming that the orifices 24 and 28 in the gage caps 23 and 27 are standardized the oil being tested and the so-called standard oil will flow through these apertures in substantially the same time when the life of the oil being tested is exhausted. It naturally follows therefore, that if the oil being tested flows through the orifice 24 in the same time or a shorter time than the so-called standard oil flows through the orifice 28, the oil in the crankcase or other place should be changed, whereas if the oil being tested takes an appreciable longer period to flow through the orifice or aperture 24 than the so-called standard oil takes to flow through the orifice 28, the oil being tested is fit for further use.

It will also be understood that instead of diluting the so-called standard oil, any given oil may be used as a standard. In this case the oil to be tested may have a viscosity less than the standard sample and still be fit for lubrication, and the operator would have to be given a predetermined maximum time difference to suit his particular case. If then the oil to be tested flows from the receptacle 20 faster than the standard oil flows from the receptacle 25 by a number of seconds equal to or greater than a predetermined maximum time, the oil being tested has lost its viscosity to such an extent as to be unfit for further lubrication. Whereas the operator understands that if the time which it takes the oil to flow from the receptacle 20 is greater than the time it takes the standard oil to flow from the receptacle 25, or less than the time, but within the predetermined maximum time difference, the oil being tested is still fit for lubrication.

It will furthermore be understood that in the use of the apparatus it is necessary that the so-called standard oil and the oil being tested should be brought to the same or substantially the same temperature before the test is made. Any suitable means may be employed for bringing the substances to the same or substantially the same temperature, but obviously, the simplest way to accomplish this is to permit the substances to remain in the containers in a given place until the temperatures are substantially the same.

I claim as my invention:

1. In an apparatus of the class described, a frame, a plurality of containers mounted in the said frame, a corresponding number of receptacles, each receptacle being secured within a container adjacent one end thereof, and means associated with each receptacle for determining the time in which a liquid of designated characteristics filling the receptacle will flow therefrom.

2. In an apparatus of the class described, a frame, two containers removably mounted in the said frame, two receptacles each mounted in one of the containers, and a discharge device associated with each receptacle for determining the period in which a liquid of designated characteristics filling the receptacle will flow therefrom.

3. In an apparatus of the class described, a frame, two containers removably mounted in the said frame, two receptacles, a cage for each receptacle for securing the same in position within and adjacent one end of a container, and means associated with each receptacle for determining the period in which a fluid of designated characteristics filling the receptacle will flow therefrom.

4. In an apparatus of the class described, a frame, two containers removably mounted in the said frame, two receptacles, a cage for each receptacle for securing the same in position within and adjacent one end of a container, and a gage cap having a discharge orifice therein associated with each of the said receptacles.

Signed by me this 5th day of January, 1926.

FRANK B. MASON.